June 17, 1952 — E. L. MORRIS — 2,600,417
COMBINED ROPE THIMBLE AND CLAMP
Filed June 17, 1949
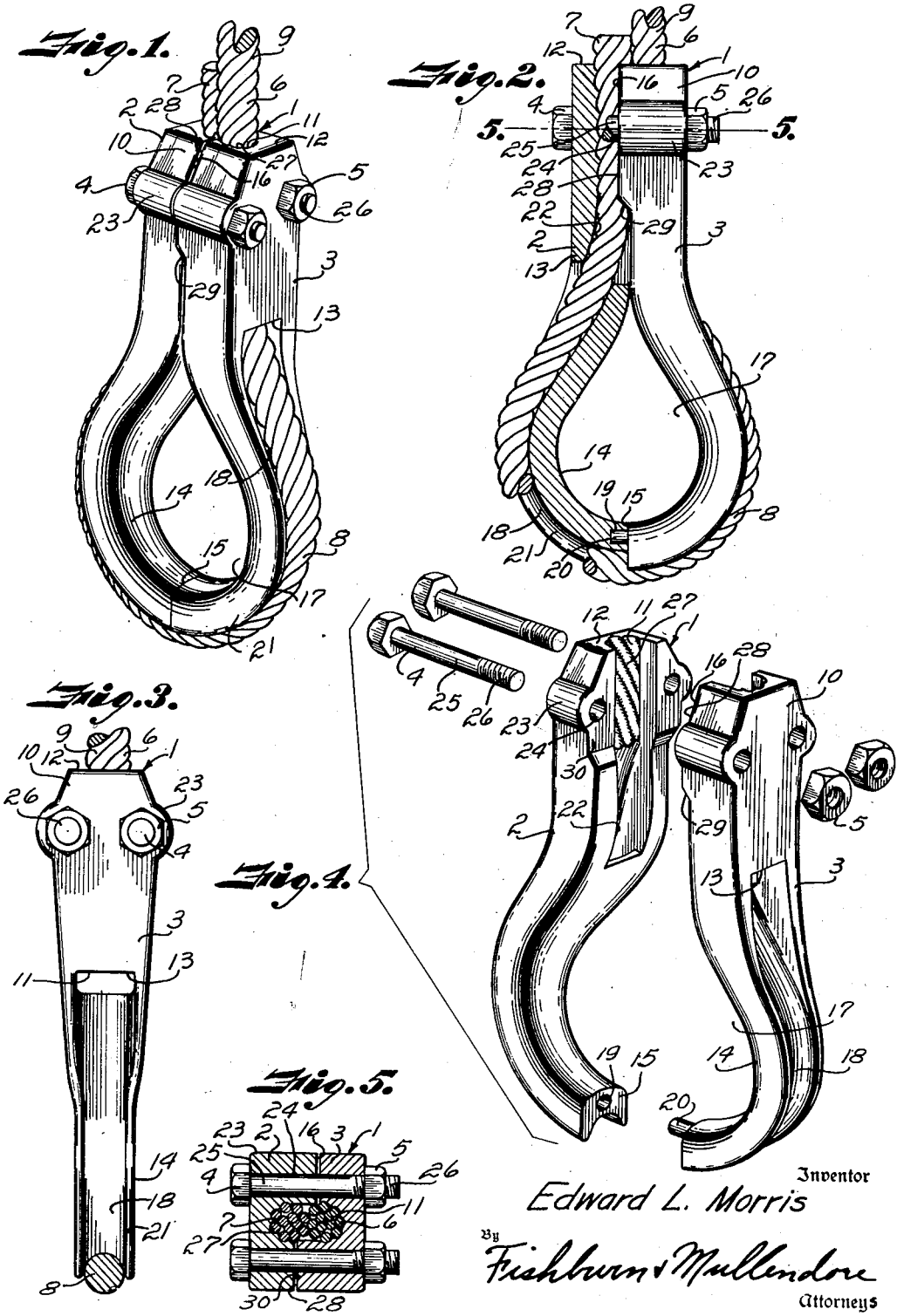
Inventor
Edward L. Morris
By Fishburn & Mullendore
Attorneys Patented June 17, 1952

2,600,417

UNITED STATES PATENT OFFICE 2,600,417

COMBINED ROPE THIMBLE AND CLAMP

Edward L. Morris, Lee's Summit, Mo., assignor to Edith Morris, Lee's Summit, Mo.

Application June 17, 1949, Serial No. 99,620

7 Claims. (Cl. 287—81)

This invention relates to a combined rope thimble and clamp for wire rope and more particularly to such a device for gripping both strands of a loop at the dead end of a rope and supporting the loop to form an eye for receiving a clevis or other connection for objects to be hoisted, anchored or otherwise subjected to heavy loads.

The objects of the invention are to provide a combined rope thimble and clamp of a minimum number of parts that are simple to manufacture, yet strong, durable and capable of holding the rope in such a manner that it will support loads substantially equal to the full breaking strength of said rope; to provide a combined rope thimble and clamp of two identical halves that are adapted to be formed of cast metal; to provide corrugations or other projections on the inner surfaces of the clamp corresponding to the lay of the strands in the rope whereby the engagement of the strands at the dead end and live end of the loop with said corrugations and each other securely clamp the dead end of the rope with minimum distortion and/or damage to the rope; to provide keys in a combined rope thimble and clamp for reducing shear load on the clamping bolts and preventing shifting of the members of the device; and to provide a combined rope thimble and clamp that can be quickly and easily applied to relatively stiff wire rope.

In accomplishing these and other objects of the present invention, I have provided improved details of structure the preferred forms of which are illustrated in the accompanying drawings, wherein:

Fig. 1 is a perspective view of a combined rope thimble and clamp embodying the features of the present invention and showing the rope clamped in position thereon.

Fig. 2 is a side elevation of the combined rope thimble and clamp, portions being broken away to better illustrate the position of the dead end of the rope therein.

Fig. 3 is an edge elevation of the combined rope thimble and clamp taken at right angles to the view shown in Fig. 2.

Fig. 4 is a detail perspective view of the parts of the combined rope thimble and clamp shown in disassembled spaced relation.

Fig. 5 is a transverse sectional view on the line 5—5, Fig. 2.

Referring more in detail to the drawings:

1 designates a combined thimble and clamp consisting of mating preferably identical half members 2 and 3, made of metal and adapted to be formed as by casting. The half members 2 and 3 are so formed that when drawn together by suitable fastening devices such as bolts 4 and nuts 5, the live and dead ends 6 and 7 respectively of a loop 8 of the end of a wire rope 9 are received and secured to the device in such a manner as to support loads substantially equal to the full breaking strength of the rope.

Each of the half members consists of an upper clamping portion 10 provided with an inwardly facing rounded channel 11 extending from the end 12 to a point 13 where an arcuate or ovate thimble portion 14 is formed as an integral extension of the clamping portion. The thimble portion terminates in a face 15 substantially in the same plane as the inner face 16 of the clamping portion 10 and is adapted to engage the like face of the other half member whereby the two ovate portions form an aperture 17 adapted to receive a pin of a clevis or the like for connecting the device to a load.

The thimble portion 14 is provided with grooves 18 in the periphery thereof for receiving the loop portion 8 of the rope 9. The terminal end faces 15 of the thimble portions 14 are preferably provided with aligned bores 19 adapted to receive and have sliding engagement with a pin 20 for preventing lateral movement of said abutting ends of the thimble. The thimble portions are preferably of such width that the sides 21 of the grooves 18 and the material between the base of the groove and the surface formed by the opening 17 have adequate strength to support a load greater than the breaking strength of the rope without collapsing or bending of the thimble portion. The portions of the thimble adjacent the clamping portions and the grooves in said thimble portions are preferably of large radius tangential to the circular portion of the groove in the thimble portion remote from the clamp whereby there is only slight bending of the rope between the live and dead ends and the intermediate portion of the loop 8. Also the channel 11 adjacent the point 13 is arcuate as at 22 to correspond to the curvature of the rope.

The clamp portions of the half members 2 and 3 are wider than the thimble portions to provide additional strength for clamping and retaining the rope therein. Also, intermediate the length of the channel 11 the clamping portions are provided with oppositely directed bosses 23 having bores 24 therein between the sides of the clamping portion and the groove 11, said bores of one half member being aligned with the bores in the other half member for receiving the shanks 25 of the bolts 4 whereby threading the nuts 5 on the threaded portions 26 of the shanks 25 will draw the clamping portions 10 together. The depth of the channels 11 are less than the diameter of the rope whereby when the faces 16 of one half member approach the faces of the other half member the rope is securely clamped in place as illustrated in Fig. 5, said channels having spiral grooves 27 corresponding to the lay of the strands of the ropes whereby when the rope is clamped in place between the clamping portions of the half sections the strands of the rope will lie in the grooves 27. This grooving of the channels 11 provides additional contact between the surface of the channels with the surface of the strands and also tends to prevent longitudinal movement of the rope thereby increasing the tendency of the clamp to secure the rope in position. Also the lays of the live end seat between the lays of the dead end whereby any stretch or movement of the live end of the rope tends to effect a spiral movement thereof which provides additional stress on the dead end to positively anchor same.

Each of the half members are provided with a boss 28 extending from the faces 16 toward the other half member, said bosses extending from the end 12 toward the thimble portion and terminating in sloping end edges 29. On the opposite side of the channels 11 the clamping portions are undercut from the faces 16 as at 30, said undercut portions corresponding in size and shape to the bosses 28. Since the half members are preferably identical the boss 28 of one half member will align with and seat in the undercut portion 30 of the other half thereby providing a key which will prevent longitudinal shifting of the half members thereby reducing the sleeving stress on the bolts 4.

In using a device constructed as described, the end 7 of the rope is threaded through the channel 11 of one half section, for example 3, through the opening at the end of the channel and placed in the groove 18 and then moved through the groove 18 of the other half section, threaded through the opening and laid in the channel end of the other half section. The faces 15 of the thimble portion are then arranged in abutting position with the pin 20 in the openings 19. Bolts 4 are then inserted through the bores 24 of both of the clamping portions, and the nuts 5 threaded on the threaded portions 26 of said bolts, said nuts being tightened to draw the clamping portions together with the boss 28 on each member seating in the undercut portion 30 of the other half portion. As the bolts are drawn up tension is applied to the live end 6 of the rope to draw same tightly around the thimble the strands of the rope seating in the grooves 27 in the channels 11. A pin or clevis is attached to a load and inserted through the aperture 17 to apply tension to the thimble portion and additional tension is applied to the live end 6 of the rope 9. As tension is increased the nuts are threaded further onto the bolts to effect tight engagement between the live and dead ends of the rope and also to effect the seating of the strands in the grooves 27. It is preferable that the rope be stressed to approximately three fourths of its rated breaking strength and the nuts given a final tightening to securely fasten the rope in the clamping member. The tension of the rope around the thimble tends to hold the end faces 15 together as well as provide additional strength to said thimble.

The rope is then ready to apply to any power mechanism for use and the thimble attached by a clevis or other suitable device to a load, said rope serving over long periods of time for ordinary loads without sign of wear, no tendency to sever any of the wire strands and with no movement of the rope in the clamping portion. In actual tests a rope has been found to break at 99 per cent of the breaking strength and has averaged approximately 96 per cent of the breaking strength.

It is believed obvious that I have provided a combination thimble and clamp which is simple in construction, economical to manufacture due to the identity of the two halves and the ability to cast same, and that the thimble securely fastens the loop of a rope in place which results in a high breaking point of the rope, said combination thimble and clamp being easy to apply to the rope.

What I claim and desire to secure by Letters Patent is:

1. A combined rope thimble and clamp comprising, a pair of members each having an integral clamp and thimble portion, said clamp portions each having an oppositely facing open channel extending longitudinally thereof to form seats for the live and dead end of a rope loop, each of the thimble portions having a groove in the periphery thereof communicating with the respective channels, interengaging means on the clamp portions for preventing relative longitudinal movement, and means for securing the clamp portions together for clamping the ends of a loop of a rope against each other in the channels.

2. A combined rope thimble and clamp comprising, a pair of identical half members each having an integral clamp and thimble portion, said clamp portions each having an oppositely facing open channel forming a seat for the rope, each of the thimble portions having a groove in the periphery thereof communicating with the respective channels, said clamp portions having recesses at one side of the channel therein, a projection on the clamp portions on the opposite side of the channel and adapted to seat in the recess of the other clamp portion to retain same against relative longitudinal movement, and means for securing the clamp portions together for clamping the ends of a loop of a rope against each other in the channels.

3. A combined rope thimble and clamp comprising, a pair of members each having integral clamp and thimble portions, said clamp portions each having a channel forming a seat for the rope, each of the thimble portions having a groove in the periphery thereof communicating with the respective channels, said clamp portions having recesses at one side of the channel therein, a projection on the clamp portions on the opposite side of the channel and adapted to seat in the recess of the other clamp portion to retain same against longitudinal movement, apertured ears in the clamp portions on opposite sides of the channels therein, and means extending through the apertured ears for drawing the clamp portions together for clamping the ends of a loop of a rope against each other in the channels.

4. A combined rope thimble and clamp comprising, a pair of identical half members each having integral clamp and thimble portions, said clamp portions each having an oppositely facing open channel forming a seat for the rope, each of the thimble portions having a groove in the periphery thereof communicating with the respective channels, said clamp portions having recesses at one side of the channel therein, a projection on the clamp portion on the opposite side of the channel and adapted to seat in the recess of the other clamp portion to retain same against longitudinal movement, apertured ears in the clamp portions on opposite sides of the channels therein, means engaging the ends of the respective thimble portions for retaining same against relative lateral movement, and means extending through the apertured ears for drawing the clamp portions together for clamping the ends of a loop of a rope against each other in the channels.

5. A combined rope thimble and clamp comprising, a pair of members each having an integral clamp and thimble portions, said clamp portions each having an oppositely facing open channel forming a seat for the rope, each of the thimble portions having a groove in the periphery thereof communicating with the respective channels, spiral grooves in the channels substantially corresponding to the spiral of strands of a rope to be used therein, and means for securing the clamp portions together for clamping the ends of a loop of a rope in the channels with the strands seated in the spiral grooves.

6. A combined rope thimble and clamp comprising, a pair of members each having an integral clamp and thimble portion, said clamp portions each having an oppositely facing open channel forming a seat for the rope, each of the thimble portions having a groove in the periphery thereof communicating with the respective channels, said clamp portions having recesses at one side of the channel therein, a projection on the clamp portions on the opposite side of the channel and adapted to seat in the recess of the other clamp portion to retain same against relative longitudinal movement, spiral grooves in the channels substantially corresponding to the spiral of strands of a rope to be used therein, and means for securing the clamp portions together for clamping the ends of a loop of a rope against each other in the channels with the strands seated in the spiral grooves.

7. A combined rope thimble and clamp comprising, a pair of identical half members each having integral clamp and thimble portions, said clamp portions each having an oppositely facing open channel forming a seat for the rope, each of the thimble portions having a groove in the periphery thereof communicating with the respective channels, said clamp portions having recesses at one side of the channel therein, projections on the clamp portions oppositely arranged relative to the recesses whereby the projections seat in the recesses to retain the clamp portions against relative longitudinal movement, said channels having spiral grooves therein substantially corresponding to the spiral strands of a rope to be used therein, apertured ears on the clamp portions on opposite sides of the channels therein, means engaging the ends of the respective thimble portions for retaining same against relative lateral movement, and means extending through the apertured ears for drawing the clamp portions together for clamping the ends of a loop of a rope against each other in the channels with the strands seated in the spiral grooves.

EDWARD L. MORRIS.

REFERENCES CITED

The following references are of record in the file of this patent:

UNITED STATES PATENTS

| Number | Name | Date |
|---|---|---|
| 421,120 | Young | Feb. 11, 1890 |
| 475,115 | Inglesby et al. | May 17, 1892 |
| 1,300,794 | Wendt-Wriedt | Apr. 15, 1919 |
| 1,680,346 | Sunderland | Aug. 14, 1928 |
| 1,690,597 | Seyler | Nov. 6, 1928 |
| 1,859,143 | Howe | May 17, 1932 |